US008198577B2

(12) United States Patent
Dierickx (10) Patent No.: US 8,198,577 B2
(45) Date of Patent: Jun. 12, 2012

(54) HIGH DYNAMIC RANGE ANALOG X-RAY PHOTON COUNTING

(75) Inventor: Bart Dierickx, Edegem (BE)

(73) Assignees: Caeleste CVBA, Edegem (BE); Bart Dierickx, Edegem (BE)

( * ) Notice: Subject to any disclaimer, the term of this patent is extended or adjusted under 35 U.S.C. 154(b) by 631 days.

(21) Appl. No.: 12/392,637

(22) Filed: Feb. 25, 2009

(65) Prior Publication Data

US 2010/0213353 A1    Aug. 26, 2010

(51) Int. Cl.
*G01J 1/44*        (2006.01)
*H01J 40/14*       (2006.01)
*H03F 3/08*        (2006.01)

(52) U.S. Cl. .......... 250/214 R; 250/214 DC; 250/214 L (58) Field of Classification Search ........... 250/214.1, 250/214 R, 214 DC, 214 L; 257/431; 310/12.03
See application file for complete search history.

(56) References Cited

U.S. PATENT DOCUMENTS 5,321,261 A * 6/1994 Valenta ................ 250/252.1
5,841,384 A * 11/1998 Herman et al. ............ 341/138

OTHER PUBLICATIONS

Perenzoni, M. et al., "A Multi-Spectral Analog Photon Counting Readout Circuit for X-Ray Hybrid Pixel Detectors", IMTC 2006—Instrumentation and Measurement Technology Conference, Sorrento, Italy, Apr. 24-27, 2006; 0-7803-9360-0/06, IEEE, p. 2003-2006.
Ballabriga, R. et al., "The Medipix3 Prototype, a Pixel Readout Chip Working in Single Photon Counting Mode with Improved Spectometric Performance", IEEE Transactions on Nuclear Science, vol. 54, No. 5, Oct. 2007, p. 1824-1829.
Lazzaro, J. et al., "Winner-Take-All Networks of O(N) Complexity", Computer Science Department Technical Report Calitech-CS-TR-21-88, California Institute of Technology, Pasadena, CA 91125, 1988.
Liu, M., "CMOS Winner-Take-All Circuits: A Tutorial", EDN Jun. 26, 2007, http://www.edn.com/article/CA6454765.html#ref.

* cited by examiner

*Primary Examiner* — Francis M Legasse, Jr.
(74) *Attorney, Agent, or Firm* — Bacon & Thomas, PLLC (57) ABSTRACT

A pixel for the detection of electromagnetic radiation or impinging high energy particles, in particular for detecting X-ray photons, including a radiation receptor for converting the electromagnetic radiation or impinging high energy particles into a radiation signal, a converter for converting the radiation signal into a pulse train, and an analog accumulator for accumulating the pulses of a pulse train to an analog signal for readout. The analog accumulator is adapted such that the analog signal is non-linearly proportional to the pulse count. Such non-linear analog accumulator has the advantage of an large dynamic range.

31 Claims, 7 Drawing Sheets

HIGH DYNAMIC RANGE ANALOG X-RAY PHOTON COUNTING

FIELD OF THE INVENTION

The present invention relates to detection of electromagnetic radiation or high energy particles. In particular, the present invention relates to methods and devices for detection of electromagnetic radiation or high energy particles, such as for example for X-ray detection, or such as photon counting of visible light.

BACKGROUND OF THE INVENTION

X-radiation (composed of X-rays) is a form of electromagnetic radiation. X-rays have a wavelength in the range of 10 to 0.01 nanometers, corresponding to frequencies in the range $30 \times 10^{15}$ Hz to $30 \times 10^{18}$ Hz, and energies in the range 120 eV to 120 keV. X-rays are primarily used for diagnostic radiography and for crystallography.

X-rays are generated by an X-ray tube, a vacuum tube that uses a high voltage to accelerate electrons released by a hot cathode to a high velocity. The high velocity electrons collide with a metal target, the anode, thus creating the X-rays ("Brehmsstralung"). The X-ray photons are emitted in pulses with variable duration.

The detection of X-rays may be based on various methods. The most commonly known methods are a photographic plate and X-ray film.

Since the 1970s, semiconductor detectors have been developed (for example silicon or germanium doped with lithium, Si(Li) or Ge(Li). X-ray photons impinging on a semiconductor material are converted to electron-hole pairs in the semiconductor material and these charge carriers are collected and generate an electrical signal representative of the impinging X-rays.

State of the art X-ray image sensing is performed with pixels that are either "charge integrating" or "photon counting". The detection itself can be "direct" (where the X-ray photon creates a packet of secondary electron-hole pairs in the semiconductor material, that are subsequently read by a charge sensitive amplifier) or "indirect" (where the X-ray photon is absorbed in a scintillator material where it creates a flash of secondary, visible light, which secondary light is subsequently detected by a visible light image sensor).

Figure 1:
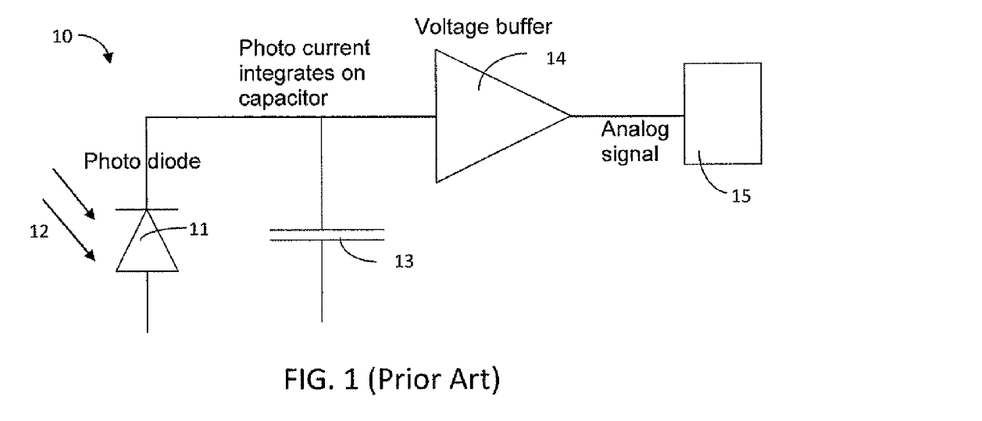
FIG. 1 schematically illustrates an integrating pixel according to one of the many possibilities known in the state of the art.

In case of charge integration and indirect detection, an image sensor is used for detection of the secondary visible radiation. The image sensor converts this visible radiation into analog electrical signals (current or voltage). The more radiation impinges on the image sensor over time, the higher the corresponding electrical signal. Charge integrating pixels are simple electronic circuits. These have three or a few more transistors. Many examples exist in the state of the art, of which a very simple one is represented in FIG. 1. The image sensor 10 illustrated comprises a phototransducer such as a photodiode 11, for converting the impinging radiation 12 into an electrical signal such as for example a photocurrent. The thus generated photocurrent integrates on an integrating element such as a capacitor 13. A voltage buffer 14 may be provided between the integrating element 13 and read-out circuitry 15 for reading out a radiation value.

Figure 2:
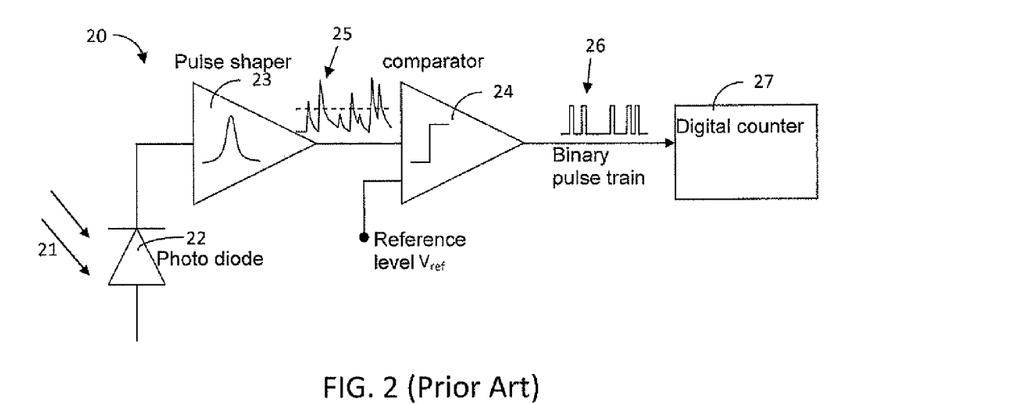
FIG. 2 schematically illustrates a prior art photon counting pixel with a digital counter which may be used in the case of X-ray detection.

In principle the X-radiation consist of separate X-ray photons, which can be detected as separate pulses. For that reason a photon counting method may be more effective than charge integration for detection of the radiation. However, known counting pixels are complex devices. They have an analog front-end that detects pulses (the front end for example comprising a pulse shaper, a comparator) and an elaborate digital counter. The number of transistors is in the hundreds (100 . . . 1000). One example of such a counting pixel 20 is illustrated in FIG. 2. Every X-ray photon 21 which impinges on a phototransducer such as a photodiode 22 creates a small charge packet with hundreds of electrons, which is shaped to a pulse 25 by a pulse shaper circuit 23. A comparator 24 compares the generated pulses 25 to a reference value $V_{ref}$. Every time the amplitude of the pulses 25 exceeds the reference value $V_{ref}$, a first value, for example high or digital one, is assigned to the output signal of the comparator 24, and every time the pulses are below the reference value $V_{ref}$, a second value, for example low or digital zero, is assigned to the output signal of the comparator 24. This way, a binary signal is generated, comprising a pulse train 26. The pulses in the pulse train 26 are then counted by means of a digital counter 27 in order to provide a count value for the impinging incident photons 21.

It is generally understood that the counting approach is superior over the charge integrating approach in terms of noise. The counting of photons is essentially noise free (apart from the inherent photon shot noise—PSN), whereas in integrating mode, the collected noise charge is contaminated by analog "read noise".

A further advantage of photon counting is that one can do at the same time energy (or wavelength) discrimination, and thus obtain at the same time images for different bands of photon energies (which is referred to as "color X-ray", similar to the wavelength discrimination in visible light image sensors).

Nevertheless, it is a disadvantage of counting pixels that they require a huge, area and power consuming, yield killing digital counter.

Perenzoni M., Stoppa D., Malfatti M., and Simoni A. disclose in "A Multi-Spectral Analog Photon Counting Readout Circuit for X-Ray Hybrid Pixel Detectors", Instrumentation and Measurement Technology Conference 2006, Proceedings of the IEEE, Publication Date: 24-27 Apr. 2006, pages 2003-2006, an all-analog pixel architecture for the readout of X-ray pixel detectors. The pixel comprises a self-triggered reset charge amplifier, three autocalibrated comparators, an energy window identification logic and three analog counters with adjustable range. Perenzoni et al. thus show a pixel that avoids the use of a large digital counter, and replaces such digital counter with an analog domain counter. In their approach, the dynamic range is somewhat reduced due to the use of that analog counter, but still it keeps the capability to count several energy bands separately.

Figure 3:
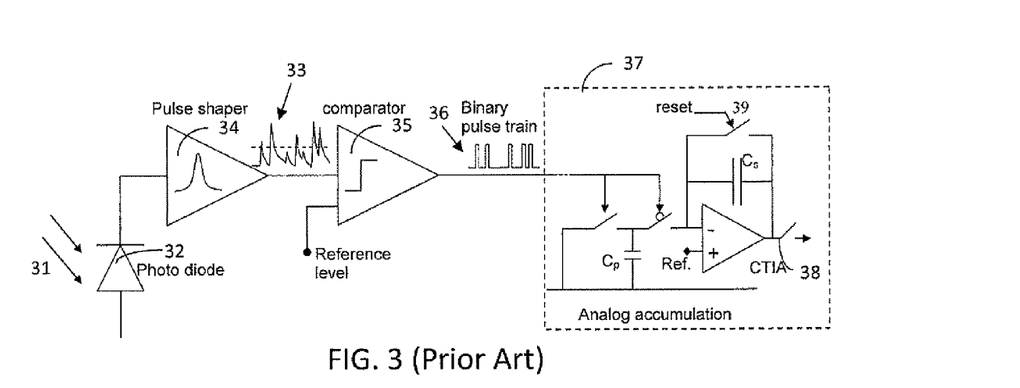
FIG. 3 schematically illustrates a prior art photon counting pixel with a linear analog accumulator.

An implementation of a counting pixel with a (linear) analog counter according to the prior art is illustrated in FIG. 3. The X-ray photons 31 which impinge on a phototransducer such as a photodiode 32 create small charge packets with hundreds of electrons, which are shaped to pulses 33 by a pulse shaper circuit 34. A comparator 35 compares the generated pulses 33 to a reference value $V_{ref}$. Every time the amplitude of the pulses 33 exceeds the reference value $V_{ref}$, a first value, for example high or digital one, is assigned to the output signal of the comparator 35, and every time the pulses are below the reference value $V_{ref}$, a second value, for example low or digital zero, is assigned to the output signal of the comparator 35. This way, a binary signal is generated, comprising a pulse train 36. The pulses in the pulse train 36 are then counted by means of an analog counter 37 in order to provide a count value 38 for the impinging incident photons 31.

The analog counter 37 comprises a counting capacitor Cs onto which a signal representative of the number of detected photons is stored. Before counting is started, the counting capacitor Cs is reset to an initial value by means of a reset system, for example comprising a reset transistor (switch) 39. The charge is accumulated on the Capacitor Cs in the feedback loop of a charge transimpedance amplifier (CTIA).

One input port of the CTIA is connected to a reference value Ref; the other input port is connected to a second capacitor Cp via a first switch. The second capacitor Cp itself can be short-circuited via a second switch. The first and second switches are operated alternatively: one opens when the other closes and vice versa. The operation of the first and second switches is controlled by the input signal of the analog counter 37, i.e. by the binary pulse train 36.

Upon reception, by the analog counter 37, of a high pulse of the pulse train 36, the charge packet is stored on the second capacitor Cp, after which it is transferred to the counting capacitor Cs.

The counting is linear because the step height is constant, thus the output voltage 38 is a linear function of the number of pulses. In this actual circuit this is realized by accumulating fixed small charge packets. The fixed charge packets are realised by a fixed voltage over the second capacitor ($\Delta Q = \Delta V * C$). In this particular case the voltage step over the second capacitor $C_p$ is kept constant by the fact that the virtual ground of the CTIA keeps the voltage on the second capacitor $C_p$ independent of the already accumulated value on the counting capacitor Cs.

The ratio Cp/Cs determines the step height in the count signal 38 when counting impinging photons. If Cp or Cs are programmable, the step height can be programmed. Also when the voltage on Cp, or the voltage difference between Cp and Cs can be programmed, the step height is programmable.

SUMMARY OF THE INVENTION

It is an object of embodiments of the present invention to provide a counting pixel with good dynamic range properties.

The above objective is accomplished by a method and device according to embodiments of the present invention.

In a first aspect, the present invention provides a pixel for the detection of electromagnetic radiation or impinging high energy particles. The pixel comprises a radiation receptor, which may be a direct detector or an indirect detector, for converting the electromagnetic radiation or impinging high energy particles into a radiation signal. The radiation signal may be an electrical signal, such as voltage, current, or charge. The pixel furthermore comprises a converter for converting the radiation signal into a pulse train, and an analog accumulator for accumulating the pulses of a pulse train to an analog signal for readout. According to embodiments of the present invention, the analog accumulator is adapted such that the analog output signal of the pixel is non-linearly proportional to the pulse count.

An advantage of analog counting is the fact that it provides natural overflow prevention compared the digital solution. Indeed, in a digital counter the risk for an overflow is severe in high intensity areas of an image. Thus, an area consuming non-overflow electronic per counter is required to avoid data ambiguity. It is particularly true in multipspectral pixels where the amount of counters is directly linked to the amount of spectral bands.

The converter for converting the radiation signal into a pulse train may comprise a comparator for detecting pulses in the radiation signal that have a magnitude, such as an amplitude or area or length or width, which is above or below a reference value, or in a range between two reference values.

A pixel according to embodiments of the present invention may comprise a plurality of comparators having different reference values. In this embodiment, the radiation signal is, in each of the comparators, and depending on the reference signals, transformed to a different binary pulse train. In embodiments of the present invention, each of the comparators may be functionally coupled to an analog accumulator in a one-to-one relationship. In these embodiments, a different output signal may be obtained at the output of the analog accumulators. In alternative embodiments, each of the comparators may be functionally coupled to an analog accumulator, a plurality of comparators being coupled to the same analog accumulator. In these embodiments, the analog accumulator accumulates the counts from each of the comparators.

A pixel according to embodiments of the present invention may comprise a plurality of accumulators for accumulating the pulses of the pulse train. The accumulators may alternatingly accumulate the pulses of subsequent pulse trains emanating from the converter. The plurality of accumulators may be set up for alternatingly accumulating a pulse train, so that one accumulator accumulates a pulse train while an output signal of at least one other accumulator is available for readout. To this end, the pixel may be provided with a multiplexer for multiplexing the pulse train signal emanating from the converter, and distributing pulse trains over the plurality of accumulators.

A pixel according to embodiments of the present invention may be adapted for accumulating a logical or analog operation of several comparators. To this end, the pixel may be provided with a logic (with flipflops), combinatoric (without flipflops) or analog (e.g. for performing width detection or pulse width modulation) component or system forming a combined pulse train from the pulse trains emanating from the several comparators. Such logic or combinatoric operations can for example be AND, NAND, NOT, EXOR, majority, maximum, minimum, difference, median, winner-takes-all etc. Also some analog components may act upon pulse trains In a pixel according to embodiments of the present invention, the non-linearity of the analog accumulator may be tunable. In alternative embodiments, a tuning switch can be provided for tuning the analog accumulator so as to switch in behaviour between different non-linear laws and/or linear laws.

In embodiments of the present invention, the analog accumulator may be adapted for accumulating the pulse train into an analog signal according to a non-linear law which is approximated by an exponential function 1−exp(−constant*counts), whereby constant is a constant value, and counts is the number of counted pulses in the pulse train. This function approximates the "highlight" or overillumination behaviour of an X-ray film.

In alternative embodiments of the present invention, the analog accumulator may be adapted for accumulating the pulse train into an analog signal according to a non-linear law which is a power function, such as for example a square root function which may be approximated by sqrt (constant*counts), whereby constant is a constant value, and counts is the number of counted pulses in the pulse train. The square root (sqrt) function results in a constant noise equivalent analog value, if the only noise source is shot noise, which is the case in photon counting.

In embodiments of the present invention, the output of an accumulator (both in embodiments with one and in embodiments with a plurality of accumulators) may be connected to a memory, such as for example an analog memory, for storing the output signal of the accumulator. The analog memory may be part of a sample and hold stage. This way, the output signal of the accumulator may be available for later readout or processing.

A pixel according to embodiments of the present invention may furthermore comprise a selector for selecting as the pixel output either the counted value or the original radiation receptor signal, e.g. collected by charge integration. Such selecting may be obtained through a selection switch or a multiplexer or any other suitable method known to a person skilled in the art.

In a second aspect, the present invention provides a method for detecting electromagnetic radiation or impinging high energy particles The method comprises converting the electromagnetic radiation or impinging high energy particles into one or more radiation signals, converting the one or more radiation signals into one or more pulse trains, and accumulating the pulses of the one or more pulse trains to one or more analog signals for readout, whereby the one or more analog signals are non-linearly proportional to the pulse count.

In embodiments of the present invention, the method may furthermore comprise shaping the radiation signal to electrical pulses.

In embodiments of the present invention, converting the electromagnetic radiation may comprise discriminating pulses having a magnitude, such as an amplitude or area or length or width, above or below a reference value, or between two reference values. Such discriminating may comprise comparing the radiation signal to at least one reference value.

In embodiments of the present invention, discriminating pulses in the radiation signal comprises comparing the radiation signal to a plurality of reference values, thus generating a plurality of pulse trains. A method according to embodiments of the present invention may further comprise performing a logic, combinatoric or analog operation on the plurality of pulse trains from one or more pixels, so as to result in a combined pulse train. Alternatively, a logic, combinatoric or analog operation may be performed on a plurality of radiation signals or pulse shaped radiation signals, i.e. before the radiation signals are converted into pulse trains. The radiation signals may be emanating from a single pixel or from a plurality of pixels. Such logic operation can for example be AND, NAND, NOT, EXOR, or majority. Such analog operation may be maximum, minimum, difference, median, winner-takes-all etc.

In embodiments of the present invention, the multiple pulse trains are differently accumulated, e.g. they act in different ways onto analog accumulators. As an example only, one pulse train may result in an increase of accumulation signal, e.g. voltage, while another pulse trains may result in a decrease of accumulation signal, e.g. voltage. This way, a difference or ratio between pulse trains may be obtained.

According to alternative embodiments of the present invention, accumulating the pulses of a pulse train may comprise accumulating the combined pulse train (combined from different pulse trains obtained from different comparators) in a single analog signal. This may be used to accumulate a fork of energies within a single pixel, or to perform maximum detection between neighbouring pixels (winner-takes-all principle).

According to embodiments of the present invention, accumulating the pulses of a pulse train may include making use of at least two accumulators which alternatingly accumulate a pulse train. The pulse trains may be subsequent pulse trains in a pulse train signal. This alternating accumulation is such that an output signal of at least one accumulator is available for readout while at least one other accumulator accumulates another pulse train.

A method according to further embodiments of the present invention may furthermore comprise storing a result of accumulating the pulses of a pulse train in a memory, for example an analog memory, for later readout or processing. The memory may be part of a sample and hold stage.

In a further aspect, the present invention provides a pixel array comprising a plurality of pixels for the detection of electromagnetic radiation or impinging high energy particles. Each pixel comprises a radiation receptor, which may be a direct detector or an indirect detector, for converting the electromagnetic radiation or impinging high energy particles into a radiation signal, and a converter for converting the radiation signal into a pulse train. The pixel array furthermore comprises an analog accumulator for accumulating the pulse trains of each of the pixels to an analog signal for readout. According to embodiments of the present invention, the array of pixels is provided with one accumulator for a plurality of pixels. Each of the converters is functionally coupled to the same analog accumulator. According to embodiments of the present invention, the accumulator can be linear or non-linear.

In particular embodiments of the present invention, the analog accumulator of the pixel array is adapted such that the accumulated analog signal is non-linearly proportional to the pulse counts. Such pixel array may furthermore comprise a converter for converting the analog signal back to a substantially linear scale by an inverse non-linear law that is coded in hardware, e.g. built in into an ADC, or in software, for example with a look-up table or a formula or an algorithm.

In embodiments of the present invention, the non-linearity of the analog accumulator may be tunable. In alternative embodiments, a tuning switch can be provided for tuning the analog accumulator so as to switch in behaviour between different non-linear laws and/or linear laws.

In a pixel array according to embodiments of the present invention, the analog accumulator may be adapted for accumulating a logical operation of several converters.

It is an advantage of embodiments of the present invention that the advantages of photon counting, such as low noise (read noise free) and energy discrimination, are achieved while implementing low complexity analog circuitry.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Particular and preferred aspects of the invention are set out in the accompanying independent and dependent claims. Features from the dependent claims may be combined with features of the independent claims and with features of other dependent claims as appropriate and not merely as explicitly set out in the claims. Aspects of the invention will be apparent from and elucidated with reference to the embodiment(s) described hereinafter.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The input signal to an image sensor pixel is the radiation intensity at the location of that pixel. The radiation may be any of optical light, IR light, UV light, high energy particles, X-rays, etc. In the following, embodiments of the present invention will be described with reference to X-rays. Embodiments of the present invention are particularly useful when the radiation intensity is low, more particularly so low that the impinging radiation arrives as single photons or pulses of photons rather than as a continuous stream of photons.

Figure 4A:
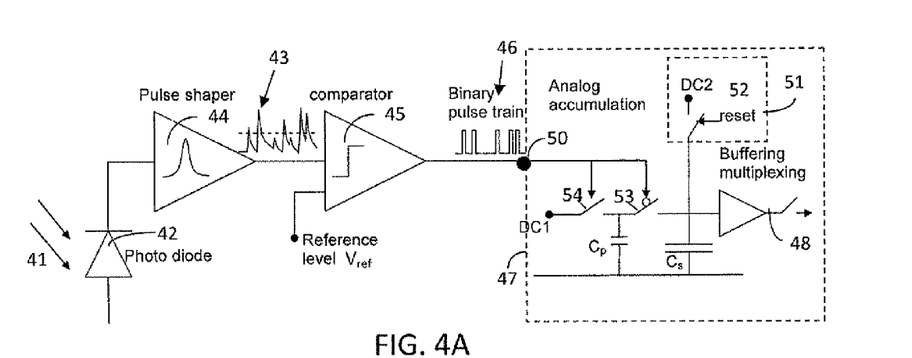
FIGS. 4A and 4B schematically illustrate implementations of a photon counting pixel with a non-linear analog accumulator according to embodiments of the present invention. The scheme of FIG. 4A realizes a (decaying) exponential non-linear accumulation. The scheme in FIG. 4B realizes a power law which is close to a square root law, as the capacitance of the diode (varactor, variable capacitor) in the feedback loop is approximately $C \sim V^n$, where n is $0.3 \ldots 0.6$.
Figure 4B:
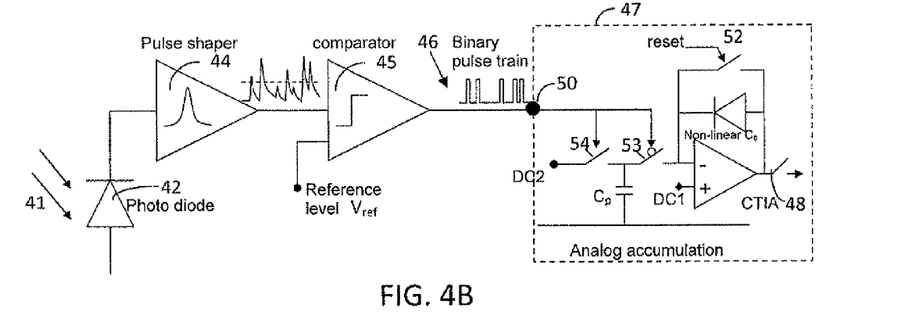

As illustrated in FIG. 4A and FIG. 4B, the intensity of the impinging X-rays 41 is transduced by a radiation receptor, e.g. a phototransducer (the sensor) and its associated circuits to an analog voltage at the output of the pixel. The sensing may be done via a sensor circuit, comprising a phototransducer such as, for example, a reverse-biased photodiode 42. The photodiode 42 collects photogenerated charge carriers, e.g. electrons, the charge carriers being generated under influence of the impinging X-rays 41 (a semiconductor substrate exposed to photons results in a release of charge carriers by the photoelectric effect). The charge carriers generate an electrical signal, such as e.g. a charge packet, a current or a voltage. For a linear phototransducer device the electrical radiation signal generated (either by amplitude, duration, integral or otherwise) is preferably proportional to the radiation intensity, i.e. to the number of impinging photons.

The X-ray photons 41 which impinge on the phototransducer such as photodiode 42 create, directly or indirectly, small charge packets with hundreds of electrons, which are shaped to electrical pulses 43 by a pulse shaper circuit 44. A comparator 45 compares the generated pulses 43 to a reference signal $V_{ref}$. The comparator 45 may have an adjustable threshold determining the reference signal $V_{ref}$; this allows separating the noise from the useful signal, and recognising the energy of the photon. In the comparator 45, the analog signal is converted into a digital signal. Every time a relevant parameter, such as e.g. the amplitude, area, width or length, of the pulses 43 exceeds a corresponding parameter in the reference signal $V_{ref}$, a first value, for example high or digital one, is assigned to the output signal of the comparator 45, and every time the pulses 43 are below the reference value $V_{ref}$, a second value, for example low or digital zero, is assigned to the output signal of the comparator 45. This way, a binary signal is made, comprising a pulse train 46.

The pulses of the pulse train 46 produced by the comparator 45 indicate that the signal is in the desired range of energies. These pulses trigger the counter 47 that increases its value. The pulses in the pulse train 46 are thus counted by means of an analog accumulator 47 in order to provide a count value 48 for the number of impinging incident photons 41.

In accordance with embodiments of the present invention, this analog accumulator 47 is non-linear. The accumulator 47 is deliberately made non-linear in the sense and with the purpose, that the analog output signal step height decreases as the number of accumulated counts increases.

A first advantage of such a non-linear analog photon counter is that the range of counts that can be usefully read out is much higher than with a linear counter, even when the step height at low count values is the same.

A second advantage is that the analog output signal increment is better matched with the inherent noise and the read noise associated with such analog signal creation and readout. This method is allowed and is beneficial, as in a linear accumulator, the noise (uncertainty on the number of counts) grows as the number of counts grows (namely, this noise is the X-ray photon shot noise, which is equal to the square root of the number of counts). Thus, if the analog readout chain is made capable to readout the smallest steps at low counts accurately, then at high counts the noise exceeds this accuracy manifold. In an adequate non-linear system, the step height can be reduced for higher counts, as one does not need to readout to an accuracy of the step height, yet to the accuracy of sqrt(counts)*step_height. Thus a significantly higher dynamic range is realised, the dynamic range being the ratio of the smallest and largest count being read accurately. This means that, in accordance with embodiments of the present invention, the accuracy is limited by the X-photon shot noise and not by the analog circuit noise.

In the embodiment illustrated in FIG. 4A, the analog accumulator 47 comprises an input port 50 for receiving the generated binary pulse train 46. The counter 47 comprises an analog memory element, e.g. counting capacitor Cs, for storing a value representative of the counted number of pulses in the pulse train 46, which corresponds to the number of impinging photons. The memory element, e.g. counting capacitor Cs, is connected to a reset system 51 for resetting the memory element, e.g. counting capacitor Cs, to an initial value. The reset system 51 may comprise a first voltage source (not illustrated) for delivering an electrical reset signal, e.g. a reset voltage DC2, and a reset switch 52 for connecting the reset signal to the memory element, e.g. counting capacitor Cs. The reset voltage DC2 may for example be a ground or supply voltage, being the initial voltage equivalent to count zero.

The analog memory element, e.g. counting capacitor Cs, is injected with a charge packet. This charge packet is created by a charge packet source, e.g. a circuit comprising a switch 54, a charge packet supply and a charge packet source memory element, e.g. capacitor Cp. A first switch 53 is provided between the analog memory element, e.g. counting capacitor Cs, and this charge packet source. The charge packet source memory element, e.g. capacitor Cp, is connected to the charge packet supply, e.g. a second voltage source, (not illustrated) for delivering an electrical charge signal, e.g. a voltage DC1, over the second switch 54. The first switch 53 and the second switch 54 are oppositely operated, i.e. the one is opened when the other one is closed and vice versa. The opening and closing of the first switch 53 and second switch 54 is determined by the value of the pulse train signal 46 at the input port 50.

After reset of the analog memory element, e.g. counting capacitor Cs, when a first high pulse 46 arrives at the input port 50, the second switch 54 is closed, thus connecting the charge packet source, e.g. the charge packet memory element thereof, such as second capacitor Cp, to the electrical charge signal DC1, and thus charging the charge packet memory element, e.g. capacitor Cp. When the high pulse has passed, and the signal in the pulse train 46 goes back to low, the second switch 54 opens, thus disconnecting the charge packet memory element, e.g. capacitor Cp, from the electrical charge signal DC1, and the first switch 53 closes, thus connecting the charge packet memory element, e.g. capacitor Cp, and the analog memory element, e.g. counting capacitor Cs, in parallel. The charge packet size that is thus transferred from the charge packet memory element, e.g. capacitor Cp, to the analog memory element, e.g. counting capacitor Cs, is proportional to the difference between the actual voltage on the analog memory element, e.g. counting capacitor Cs, and the charge packet supply voltage DC1. Initially this difference is equal to DC2−DC1, but as the charge accumulates on the counting capacitor Cs, this difference gradually decreases as a decaying exponential function ($V \sim 1-\exp(-\text{constant}*\text{counts})$).

This way, with every new pulse in the pulse train 46, the signal on the analog memory element, e.g. counting capacitor Cs, is increased; however, in a non-linear way. By thus counting in a non-linear way, for every further photon detected, the increment in the count signal is smaller.

In the above-described analog accumulator 47 the ratio of the capacitance values of the capacitors Cp/Cs determines the initial step height of the analog counting signal. If Cp or Cs are programmable, and/or DC1 and DC2, the initial step height can be programmed.

The output port of the analog accumulator 47 may be coupled to a memory (not illustrated in the drawings), such as for example an analog memory, which may be part of a sample and hold stage, so that the count value 48 may be stored for later readout or processing.

FIG. 4B show another implementation of an analog accumulator according to embodiments of the present invention, that realizes an approximate square root law.

This is realized by a charge transimpedance amplifier (CTIA) which has a strongly non-linear capacitor in the feedback loop (illustrated by a diode symbol).

The analog memory element, e.g. non-linear counting capacitor Cs, is injected with a charge packet. This charge packet is created by a charge packet source, e.g. a circuit comprising a switch 54, a charge packet supply and a charge packet source memory element, e.g. capacitor Cp. A first switch 53 is provided between the analog memory element, e.g. counting capacitor Cs, and this charge packet source. The charge packet source memory element, e.g. capacitor Cp, is connected to the charge packet supply, e.g. a voltage source, (not illustrated) for delivering an electrical charge signal, e.g. a voltage DC2, over the second switch 54. The first switch 53 and the second switch 54 are oppositely operated, i.e. the one is opened when the other one is closed and vice versa. The opening and closing of the first switch 53 and second switch 54 is determined by the value of the pulse train signal 46 at the input port 50.

Upon reception, by the analog counter 47, of a high pulse of the pulse train 46, switch 54 closes and a charge packet is stored on the charge packet source memory element, e.g. capacitor Cp. Upon opening of the switch 54 and closing of the switch 53, the charge packet is transferred to the non-linear counting capacitor Cs.

The voltage DC1 and the voltage DC2 of the charge packet source need to be properly adjusted to obtain a good non-linear law. The non-linearity of the analog accumulator can be tuned by changing the difference between DC1 and DC2.

Figure 5:
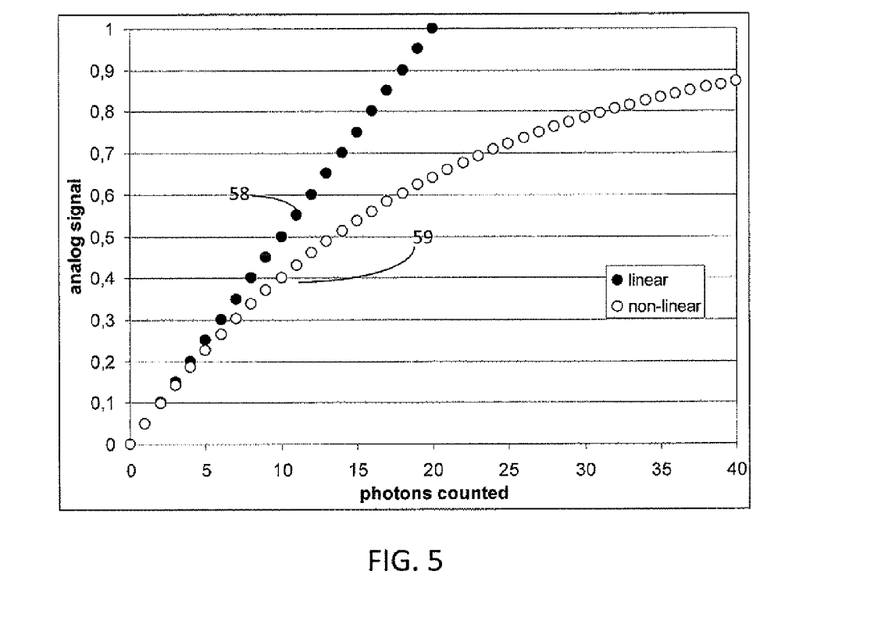
FIG. 5 is an example of an analog accumulated signal in case of a photon counting pixel with linear analog accumulator as in FIG. 3 and in case of a photon counting pixel with non-linear analog accumulator in accordance with embodiments of the present invention such as in FIG. 4A.

FIG. 5 shows an example of an analog accumulated signal in case of a photon counting pixel with linear analog accumulator as in FIG. 3 (prior art) (graph 58) and in case of a photon counting pixel with non-linear analog accumulator according to embodiments of the present invention, as for example in FIG. 4A (graph 59). The Y-axis shows the analog count signal referred to the initial or "reset" value of the capacitor Cs. The X-axis shows the number of photons detected and thus counted. The graph 58 represented by the black symbols show a linear response as in the prior art, with a step height of 0.05 V for every detected photon, and saturating at 1.0 V. It can be seen that maximum twenty photons can be detected, after which the detector saturates. The graph 59 represented by the white symbols show a non-linear response for a particular case, initially having a same step height of 0.05 V, whereby the step height gradually decreases as the analog signal stored on the first memory element, e.g. capacitor Cs, increases. The non-linear response according to embodiments of the present invention, although making a quantitative interpretation of the count more cumbersome (even though calibration is straightforward), has the advantage that the analog signal does not saturate as easily: it allows to record "highlights" or over-illuminated parts in the image, thereby extending the dynamic range, defined as the maximum photon count at saturation divided by the initial count step, far beyond the dynamic range of a linear analog accumulator.

Digital counters have an unlimited dynamic range (signal to noise ratio), at least, this range is limited only by the number of bits in the counter. In analog domain a signal cannot have an unlimited S/N ratio, as analog components suffer from electronic device noise and environment noise.

Yet, one can with embodiments of the present invention extend the dynamic range easily beyond the S/N of one analog accumulator, by putting several analog accumulators in parallel, and giving each a different step height. The lower signal range will be covered by the high step height accumulator, the higher signal range will be covered by the lower step height accumulators.

This is, as an example only, illustrated in FIG. 78. A pixel comprises a radiation receptor (not illustrated) for receiving radiation or high energy particles and converting them into a radiation signal, a comparator for converting the radiation signal into a pulse train 73, and a plurality of analog accumulators 74, 75 for accumulating the first pulse train 73 to a plurality of analog signals for readout. Each of the accumulators 74, 75, in the embodiment illustrated, comprises a charge packet source, comprising a charge packet memory element Cp1, Cp2, respectively, a first switch 76a, 76b, respectively, and a charge packet supply, e.g. a voltage source, (not illustrated) for delivering an electrical charge signal, e.g. a voltage DC1, DC2, respectively, over the switch 76a, 76b. The charge packet source is coupled over a second switch 77a, 77b, respectively, to the counting capacitor Cs1, Cs2, respectively. The first switch 76a, 76b, respectively, and the second switch 77a, 77b, respectively, are oppositely operated, i.e. the one is opened when the other one is closed and vice versa. The opening and closing of the first switch 76a, 76b, respectively, and the second switch 77a, 77b, respectively, is determined by the value of the pulse train signal 46 at the input port.

Every time a high pulse is present in the pulse train 73, the accumulated charge on the memory elements, e.g. storing capacitors Cs1 and Cs2, increases with a value dependent on the respective charge packet sources, more particularly in the embodiment illustrated the charge packet supplies DC1, DC2, respectively, and the capacitances of the charge packet memory elements Cp1, Cp2, respectively.

In alternative embodiments of the present invention, a plurality of accumulators may be provided, which each are capable and set up for receiving pulses of a pulse train emanating from one pixel as in the schematic illustration of FIG. 7B, or emanating from a plurality of pixels. The accumulators may be adapted for alternatingly accumulating a pulse train, e.g. parts of a pulse train if the at least two accumulators receive a same pulse train, so that at least one accumulator is set up for accumulating while at least one other accumulator is available for readout. A controller may be provided for controlling at any moment in time which one(s) of the plurality of accumulators perform(s) accumulation, and which one(s) is (are) available for readout.

The non-linearity that is produced by the implementation of the analog accumulator as illustrated in FIG. 4A is an exponential function (1−exp(−constant*counts)), as also illustrated in FIG. 5. This is a useful function, as it keeps a finite S/N ratio over a very wide dynamic range of counted values (in the example illustrated up to more than 40 photons counted).

An alternative non-linear function is the square root function, which has, in the presence of sole photon shot noise, a constant equivalent analog noise. Such square root function may for example be obtained with embodiments of circuits as illustrated in FIG. 4B.

Figure 6:
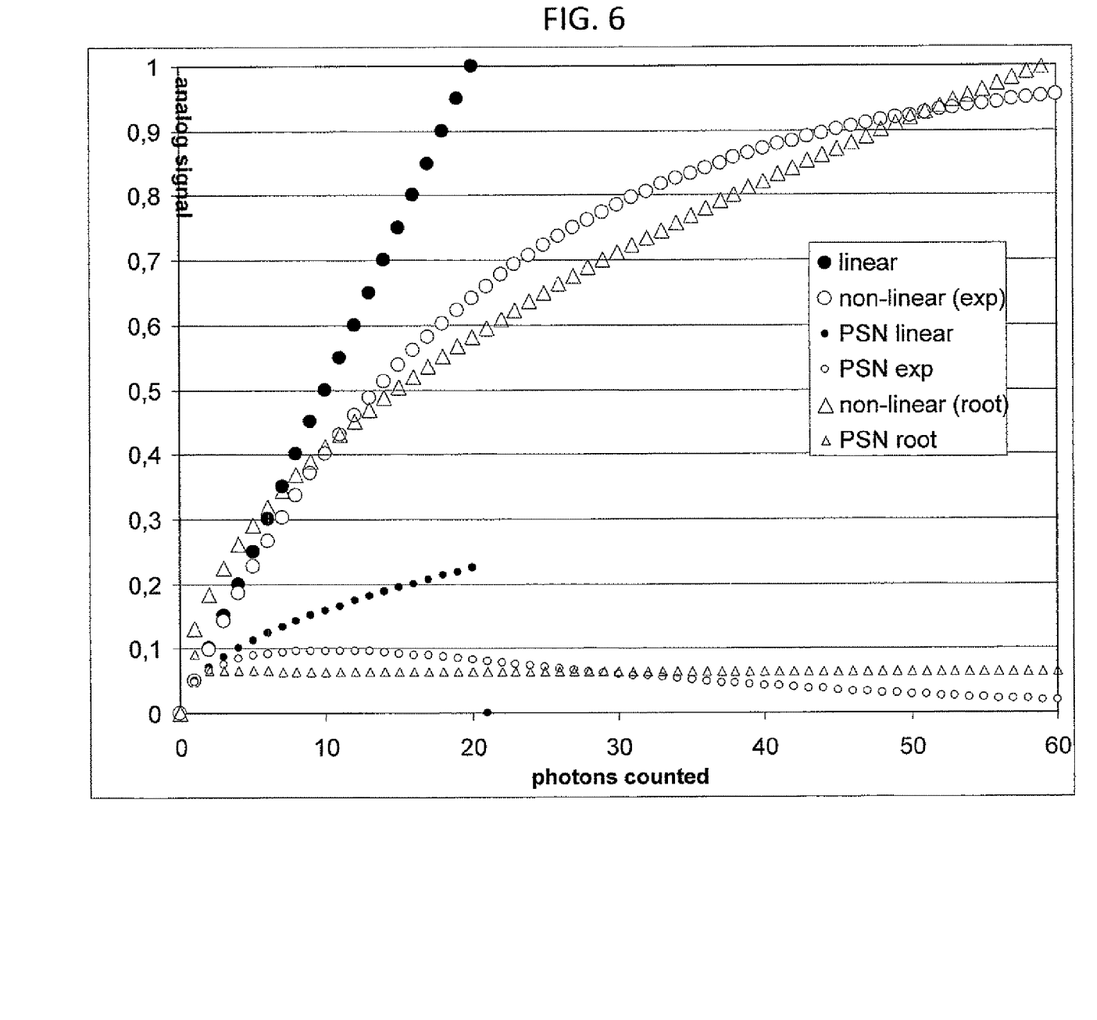
FIG. 6 illustrates possible linear an non-linear laws and their corresponding photon shot noise for an analog accumulator according to embodiments of the present invention. Shown are a linear law and two non-linear laws that are of particular interest: an exponential law (approximating the behaviour of FIG. 4A) and a square root law (e.g. realized by a circuit as FIG. 4B), which is a law that results in an optimal signal to noise ration of a wide dynamic range. The big symbols in the graph are the linear and non-linear laws themselves, the small symbols are the statistical "photon shot noise" on the same scale as the voltage reading of the analog counter.

Both non-linear laws and their equivalent analog read noise are illustrated in FIG. 6. The graphs represented by the large signals illustrate a linear law (●), a non-linear exponential law (○) and a non-linear square root law (Δ) for an analog counter. The graphs represented by the small symbols illustrate the equivalent noise on the analog V-scale that corresponds to the photon shot noise (PSN) of the number of counted photons: PSN for the linear law (•), for the non-linear exponential law (○) and for the non-linear square root law (Δ). It is to be observed that the non-linear laws, especially the square root law, have a quite constant noise over a much wider dynamic range compared to the linear counter.

In particular embodiments of the present invention, an analog accumulator may accumulate the signal of two or more pixels. In this case, each pixel comprises a photodiode for converting the electromagnetic radiation or impinging higher energy particles into a radiation signal, a comparator for converting the radiation signal into a pulse train, and an analog accumulator for accumulating the pulse train to an analog signal for readout. The analog accumulator is shared by at least two pixels.

Figure 7A:
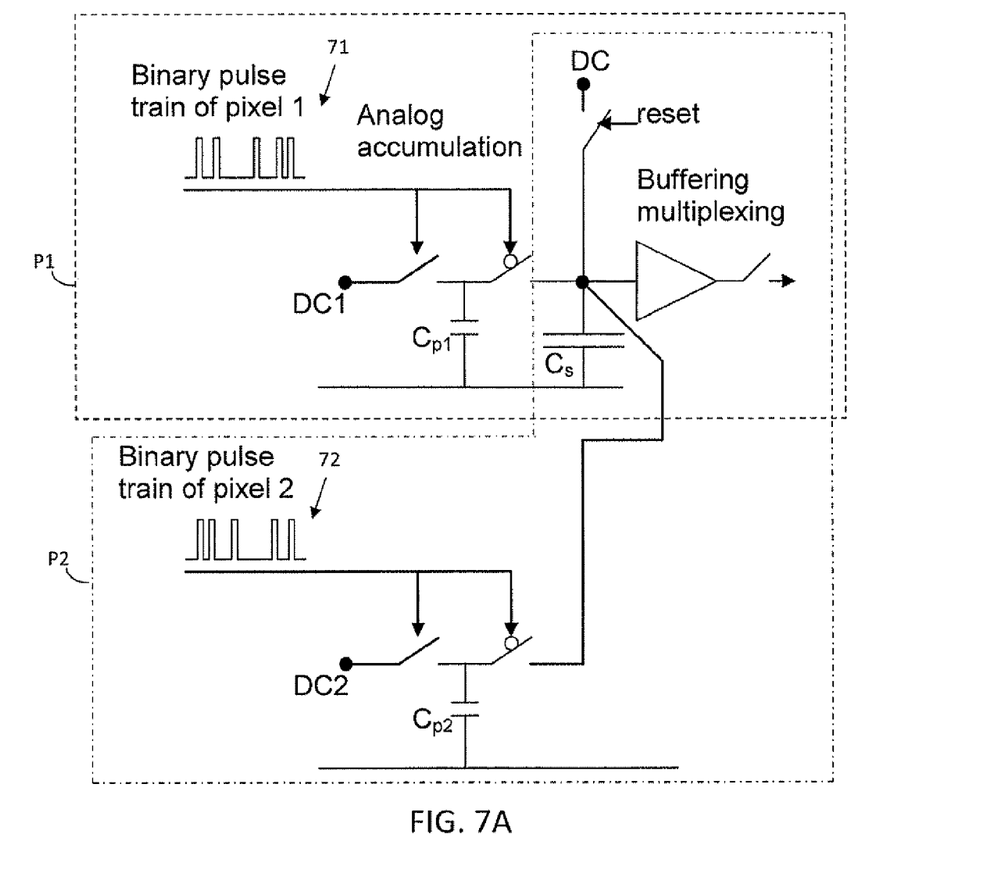
FIG. 7A is an example of how the counts of two pixels (two independent pulse trains) can be accumulated into a same analog signal according to embodiments of the present invention.
Figure 7B:
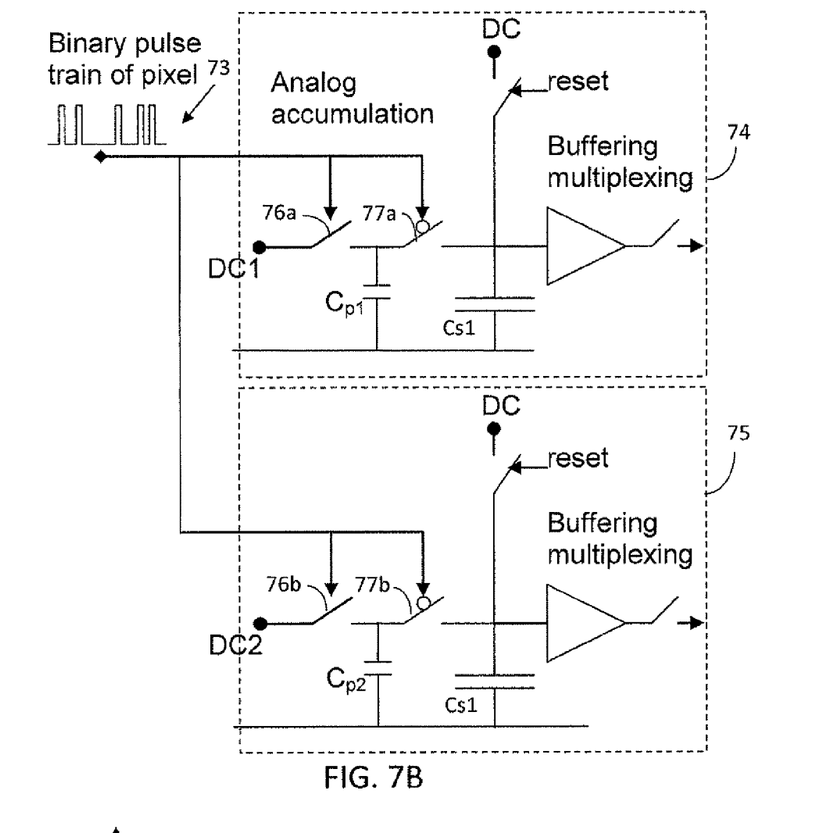
FIG. 7B is an example of how a same pulse train can be accumulated in two analog accumulators that each have different step height and/or analog range, which is programmed in the example illustrated by having different capacitance values for Cp1 and Cp2 and different voltage values for DC1 and DC2.

An example where the analog accumulator is shared by two pixels is illustrated in FIG. 7A. The first pixel P1 comprises a first photodiode (not illustrated) for converting the electromagnetic radiation or high energy particles impinging onto the first photodiode into a first radiation signal, a first comparator (not illustrated) for converting the first radiation signal into a first pulse train 71, and an analog accumulator for accumulating the first pulse train 71 to an analog signal for readout. The second pixel P2 comprises a second photodiode (not illustrated) for converting the electromagnetic radiation or high energy particles impinging onto the second photodiode into a second radiation signal, a second comparator (not illustrated) for converting the second radiation signal into a second pulse train 72, and the analog accumulator for accumulating the second pulse train 72 to an analog signal for readout. The first and second pixel's comparators may have the same reference level, but this is not obligatory. The first pulse train 71 and the second pulse train 72 are accumulated on a single memory element, e.g. storing capacitor Cs. Every time a high pulse is present in the first or second pulse trains 71, 72, the accumulated charge on the memory element, e.g. storing capacitor Cs, increases. The memory element, e.g. storing capacitor Cs, thus accumulates the charges from both pixels P1 and P2. Hence signals of neighbouring pixels can be accumulated without adding extra noise. This is an operation similar to what is called "binning" in CCDs.

According to embodiments of the present invention, such shared analog accumulator may be a linear or a non-linear accumulator. Only an embodiment with a non-linear accumulator is illustrated in FIG. 7A.

A structure according to the schematic illustrated in FIG. 7A can, according to embodiments of the present invention, also be implemented to accumulate different pulse trains of a single pixel (provided with a plurality of converters) on one and the same memory element, e.g. counting capacitor Cs.

Figure 7C:
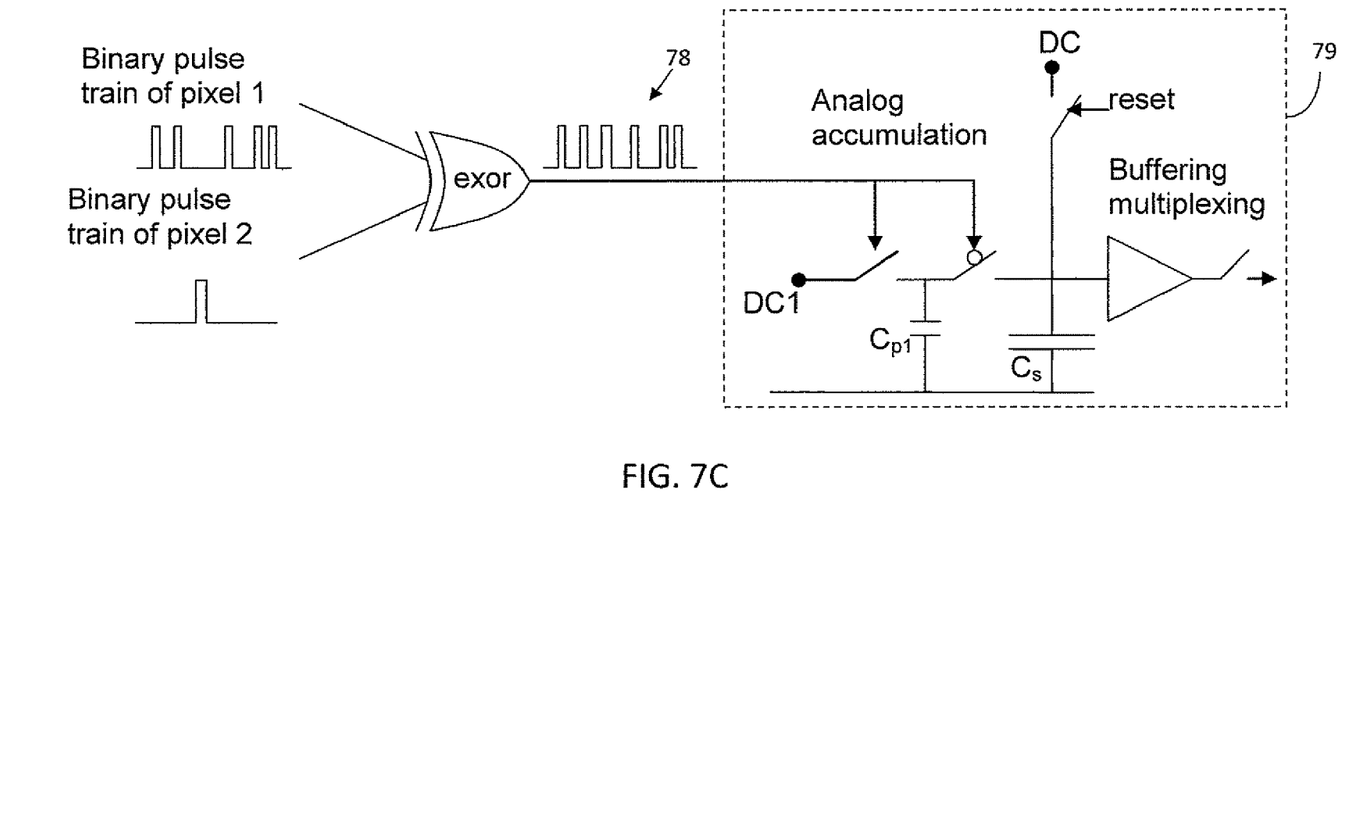
FIG. 7C is an example of how a logical operation can be carried out on two pulse trains according to embodiments of the present invention.

According to further embodiments of the present invention, a logic operation can be performed on multiple pulse trains before counting the pulses. The multiple pulse trains can emanate from a plurality of comparators of a single pixel or from a plurality of comparators of a plurality of pixels. In the example illustrated in FIG. 7C, an EXOR operation on two pulse trains, binary pulse train of pixel 1 and binary pulse train of pixel 2, results in the combined (EXOR-ed) pulses 78 being accumulated. The accumulator 79 can be a non-linear accumulator as in accordance with embodiments of the present invention, but in alternative embodiments can be a linear accumulator as known from the prior art (not illustrated).

According to further embodiments of the present invention, analog operators may act upon one or more pulse trains. In embodiments of the present invention (not illustrated in the drawings), an analog operator may act upon the signal emanating from the comparator 45, and the output signal of the analog operator may be fed to an analog accumulator. In alternative embodiments, the analog operator may act upon the signal that comes from one or more pulse shapers 44, after which the result of such analog operator may be fed to one or more comparators 45. In accordance with embodiments of the present invention, an analog operator may act on signals of a single pixel, or may act on signals of a group of pixels. Analog operators may for example, but not limited thereto, be differencing, inversion, linear combinations, maximum or minimum operations, integration, differentiation, linear and non-linear filters, coincidence detection, linear and non-linear interpolation, pulse width modulation and demodulation, amplitude modulation, frequency modulation, phase modulation, etc.

Figure 7D:
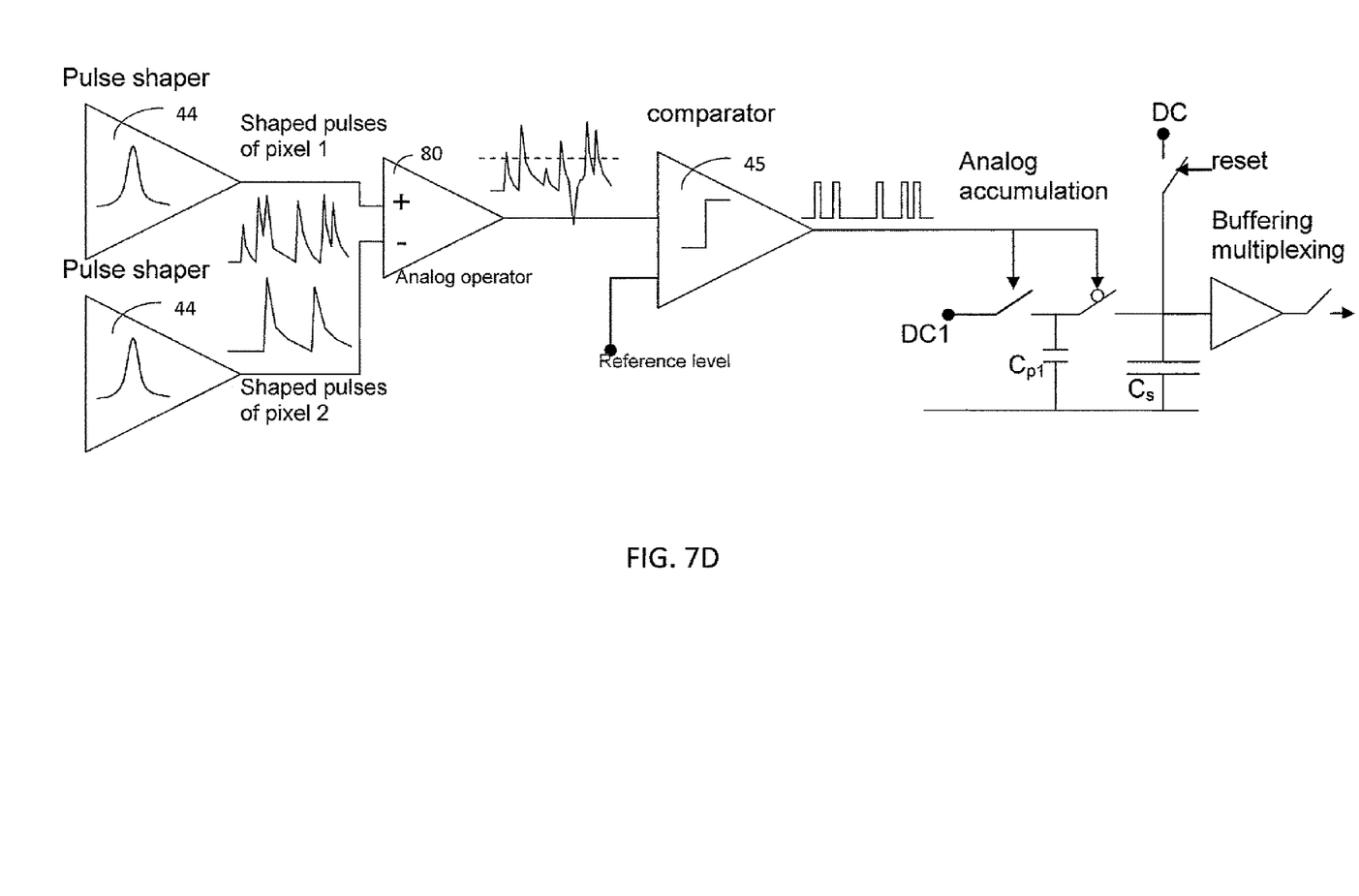
FIG. 7D is an example of how an analog operation is carried out on the signal of two pixels before the comparator.

FIG. 7D illustrates one embodiment where the analog operator is a differencing operator 80, that effectively inhibits the propagation of the signal of a first pixel if a pulse coincides with a pulse of a second pixel. Both pixels comprise a radiation detector (not illustrated) for receiving radiation or high energy particles and converting them into a radiation signal. In the embodiment illustrated, the radiation signal of each pixel is applied to a pulse shaper circuit 44 for shaping the radiation signal into electrical pulses. An analog operator 80, being a differencing circuit in the example illustrated, makes a difference of the two shaped radiation signals. This difference signal is then fed to a comparator 45, which is a comparator common to the first and the second pixel, where the difference signal is compared to a reference signal, and every time a relevant parameter of the difference signal, e.g. amplitude, area, width or length, equals a corresponding parameter in the reference signal, a first value, for example high or digital one, is assigned to the output signal of the comparator 45, and every time the pulses of the difference signal exceed the reference value in positive or negative direction, a second value, for example low or digital zero, is assigned to the output signal of the comparator 45. This way, the output of the comparator 45 is a pulse train in the form of a binary signal. According to the present invention, this pulse train is applied to an analog accumulator, for example a non-linear analog accumulator.

According to further embodiments of the present invention, a pixel is provided with an analog counter that performs a logic operation of the pixels which it counts and its neighbours. The analog counter may be a linear or a non-linear counter. The counter compares the pulse amplitude of coinciding pulses of neighbouring pixels, and suppresses the pulse if the pulse of at least one neighbouring pixel is larger. For that purpose a circuit is present that compares the pulse height of the involved pixel and its neighbours. Such comparators may be of various nature know to people skilled in the art. This has as effect that a pulse that is spread out over multiple pixels is only counted in its maximum, thus improving the sharpness of the image.

Figure 8:
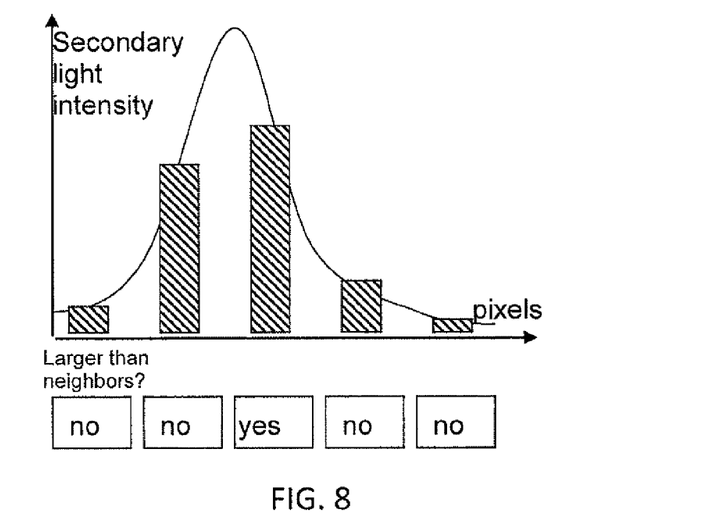
FIG. 8 illustrates an example of an analog accumulator according to embodiments of the present invention that compares the pulse amplitude of coinciding pulses of neighbouring pixels and suppresses the pulse if the pulse of at least one neighbouring pixel is larger. This drawing shows such operation in one dimension only. In a two-dimensional pixel array, one may realize such operation in two dimensions.

This is illustrated in FIG. 8. In this example, the secondary light, which is a light flash emitted by the absorption of an X-ray in a scintillator, is smeared out over several neighbouring pixels. The operator "is larger than its neighbours" will, however, result in a "yes" for the most central pixel(s) only.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to include any specific characteristics of the features or aspects of the invention with which that terminology is associated.

Many alternative embodiments are possible. One such embodiment relates to the photon counting of visible light photons by avalanche photo diodes (APDs) or similar devices. These produce on the detection of a visible light photon a current pulse that can be treated in a similar way as described above, and the amount of detected photons may be accumulated in the analog domain in a similar way.

The invention claimed is:

1. A pixel for the detection of electromagnetic radiation or impinging high energy particles, comprising
   a radiation receptor that converts the electromagnetic radiation or impinging high energy particles into a radiation signal,
   a converter that converts the radiation signal into a binary pulse train, and
   an analog accumulator comprising a charge packet source for generating a charge packet for each pulse of the binary pulse train, and an analog memory element storing an analog signal representative of the counted number of pulses in the binary pulse train by accumulating the charge packets, wherein the analog accumulator is configured such that the analog signal is non-linearly proportional to the pulse count.

2. The pixel according to claim 1, wherein the analog memory element comprises a capacitor.

3. The pixel according to claim 1, wherein the converter comprises a pulse shaper for converting the radiation signal into electrical pulses, and a comparator that detects electrical pulses that have a magnitude above or below a reference value, or between two reference values.

4. The pixel according to claim 1, wherein the non-linearity of the analog accumulator is tunable.

5. The pixel according to claim 1, wherein the analog accumulator is arranged to accumulate the pulse train into an analog signal according to a non-linear law which is approximated by an exponential function 1-exp(-constant*counts), wherein constant is a constant value, and counts is the number of counted pulses in the pulse train.

6. The pixel according to claim 1, wherein the analog accumulator is arranged to accumulate the pulse train into an analog signal according to a non-linear law which is a power function.

7. The pixel according to claim 1, furthermore comprising a selector for selecting as the pixel output either the pulse count value or the original radiation signal.

8. The pixel according to claim 2, wherein the capacitor comprise a programmable capacitor.

9. The pixel according to claim 2, wherein the analog accumulator further comprises a charge transimpedance amplifier, and wherein the analog memory element comprises a non-linear capacitor in a feedback loop of a charge transimpedance amplifier.

10. The pixel according to claim 9, wherein the non-linear capacitor comprises a varactor.

11. The pixel according to claim 3, comprising a plurality of comparators having different reference values.

12. The pixel according to claim 11, wherein each of the comparators is functionally coupled to an analog accumulator in a one-to-one relationship.

13. The pixel according to claim 11, wherein each of the comparators is functionally coupled to an analog accumulator, a plurality of comparators being coupled to the same analog accumulator.

14. The pixel according to claim 11, wherein the pixel is configured to accumulate a logical or analog operation of several comparators.

15. A method for detecting electromagnetic radiation or impinging high energy particles, the method comprising:
converting the electromagnetic radiation or impinging high energy particles into one or more radiation signals,
converting the one or more radiation signals into one or more binary pulse trains,
generating a charge packet for each pulse of the one or more binary pulse trains,
storing one or more analog signals representative of the counted number of pulses of the one or more binary pulse trains by accumulating the charge packets on one or more analog memory elements,
wherein the one or more analog signals are non-linearly proportional to a pulse count.

16. The method according to claim 15, wherein storing one or more analog signals representative of the counted number of pulses of the one or more binary pulse trains includes accumulating the charge packets on one or more capacitors.

17. The method according to claim 15, wherein converting the electromagnetic radiation comprises shaping the radiation signal to electrical pulses, and discriminating the electrical pulses having a magnitude above or below a reference value, or between two reference values.

18. The method according to claim 15, furthermore comprising performing an analog operation on the radiation signals.

19. The method according to claim 15, wherein accumulating the pulses of one or more pulse trains includes making use of at least two accumulators which alternatingly accumulate a pulse train, an output signal of at least one accumulator being available for readout while at least one other accumulator accumulates a pulse train.

20. The method according to claim 15, furthermore comprising storing a result of accumulating the pulses of one or more pulse trains in an analog memory for later readout or processing.

21. The method according to claim 15, including performing an analog operation on radiation signals before they are converted into binary pulse trains.

22. The method according to claim 17, wherein discriminating comprises comparing the radiation signal to a plurality of reference values, thus generating a plurality of pulse trains.

23. The method according to claim 22, further comprising performing a logical, combinatoric or analog operation on the plurality of pulse trains, so as to result in a combined pulse train.

24. The method according to claim 22, wherein accumulating the pulses of a pulse train comprises accumulating the combined pulse train in a single analog signal.

25. A pixel array comprising a plurality of pixels for the detection of electromagnetic radiation or impinging high energy particles, each pixel comprising
a radiation receptor that converts the electromagnetic radiation or impinging high energy particles into a radiation signal, and
a converter that converts the radiation signal into a pulse train, the pixel array furthermore comprising an analog accumulator comprising a charge packet source for generating a charge packet for each pulse of the pulse train, and an analog memory element for storing an analog signal representative of the counted number of pulses of the pulse train by accumulating the charge packets.

26. The pixel array as in claim 25, wherein the analog accumulator is configured so that the accumulated analog signal is non-linearly proportional to pulse counts.

27. The pixel array as in claim 25, furthermore comprising a logical operator for performing a logic operation on multiple pulse trains emanating from a single pixel or from a plurality of pixels, the logical operator generating a binary pulse train which is presented to the analog accumulator.

28. The pixel array as in claim 25, the array comprising a circuit that comprises pulse amplitude of coinciding pulses of neighbouring pixels, and suppressess the pulse if the pulse height of at least one neighbouring pixel is larger.

29. The pixel array as in claim 25, the array including a circuit for performing coincidence detection.

30. The pixel array as in claim 26, furthermore comprising a converter for converting the analog signal back to a substantially linear scale by an inverse non-linear law that is coded in hardware or in software.

31. The pixel array according to claim 26, wherein the non-linearity of the analog accumulator is tunable.

* * * * *